United States Patent [19]

Selby

[11] Patent Number: 4,876,738

[45] Date of Patent: Oct. 24, 1989

[54] MOBILE RADIO TRANSMISSION SYSTEM

[75] Inventor: Geoffrey R. Selby, Banstead, England

[73] Assignee: U.S. Philips Corporation, New York, N.Y.

[21] Appl. No.: 98,443

[22] Filed: Sep. 16, 1987

[30] Foreign Application Priority Data

Sep. 18, 1986 [GB] United Kingdom ............... 8622506

[51] Int. Cl.$^4$ ........................... H04B 1/00; H04Q 7/00
[52] U.S. Cl. ......................................... 455/33; 455/54; 455/56; 379/59; 379/60
[58] Field of Search ................... 455/33, 52, 53, 54, 455/56, 58; 340/825.44, 825.48; 379/59, 60, 63

[56] References Cited

U.S. PATENT DOCUMENTS

| | | | |
|---|---|---|---|
| 4,398,289 | 8/1983 | Schoute | 370/93 |
| 4,644,351 | 2/1987 | Zabarsky et al. | 340/825.44 |
| 4,654,879 | 3/1987 | Goldman et al. | 455/33 |
| 4,696,027 | 9/1987 | Bonta | 379/60 |
| 4,698,839 | 10/1987 | DeVaney et al. | 379/60 |

OTHER PUBLICATIONS

"UK Trunking System Signalling Standard–Protocol Aspects"; *Journal of the IERE;* May/Jun. 1987; Mabey et al.; pp. 119–124.

Primary Examiner—Robert L. Griffin
Assistant Examiner—Ralph E. Smith
Attorney, Agent, or Firm—David R. Treacy

[57] ABSTRACT

A mobile radio tarnsmission system comprises a plurality of base stations (BS) with corresponding service areas (SA) which together cover a geographical area through which mobile stations (M) can roam. Each base station is connected to a central station (CS) by means of a respective two-way communication link (CL). In order that it can be contacted without all the base stations having to put out a call, each mobile station registers in known manner with the base station in whose service area it is situated, and this is recorded by the control station. When it roams into a new service area this process is repeated. However, in order to preclude frequent re-registrations when the mobile station repeatedly crosses the boundary between two service areas, when it registers with a new base station and hence a new service area it retains its registration with at least one service area with which it is already registered, thereby creating its own customized enlarged registration area. Thus the transmission overhead created by the registration procedure is reduced.

15 Claims, 6 Drawing Sheets

MOBILE RADIO TRANSMISSION SYSTEM

DESCRIPTION

Background of the Invention

This invention relates to a mobile radio transmission system comprising a plurality of base stations situated at respective geographical locations to thereby define a plurality of service areas, and a plurality of mobile stations capable of communicating by two-way radio with each base station when in communication range of that base station. A control arrangement for the system includes a location record corresponding to each mobile station, for storing a service area identity. The invention also relates to a mobile station for use in such a system.

In known systems of this type, each mobile station is arranged when operative to register with a base station of which it is within communication range and thereby with the corresponding service area. When the mobile station is no longer within communication range of a base station serving a service area with which it is currently registered, it registers with another base station within its range (if any) and thereby with the corresponding service area. The control circuits respond to each registration by storing the identity of the service area corresponding to the relevant base station in that one of the location records which corresponds to the registering mobile station. The registration procedure is carried out so that if it is desired to call a particular mobile station, the identity of the service area where the mobile station is currently located is known. The control circuits arrange that the call is directed to the or each base station which serves the relevant service area, which base station in turn calls the relevant mobile station. If there were no registration procedure, all the base stations of the system would have to call the particular mobile station, which would impose a considerable overhead on the transmission capacity of the system.

There is, however, a disadvantage with the known registration procedures in that if a mobile station is roaming near a border between two or more service areas, so that it frequently moves between areas, it will frequently change its registration from one service area to another, again imposing a considerable overhead on the communication channel capacity of the system. This problem can be aggravated due to local obstructions, for example gas holders and large buildings, which can cause received signal levels to vary minute by minute. It is an object of the invention to mitigate this disadvantage.

SUMMARY OF THE INVENTION

The invention provides a mobile radio transmission system comprising a plurality of base stations which are situated at respective geographical locations to thereby define a plurality of service areas, and a plurality of mobile stations capable of communicating by two-way radio with each base station when in communication range of that base station. Control circuits contain a location record corresponding to each mobile station. According to the invention characterised in that characterised in that each location record is capable of storing at least two service area identities, and each mobile station also includes a location record capable of storing at least two service area identities. When a mobile station is not within communication range of any base station serving a service area, the identity of which is currently stored in the location record included therein, the mobile station communicates with a base station which is within range. The mobile station stores the identity of the service area served by that base station in the location record in such a manner that the identity replaces the identity of another service area already present in the mobile station location record if the resulting number of stored identities would otherwise exceed a given value n greater than one. The control circuits are arranged to respond to each such communication by updating the contents of that location record included therein which corresponds to the communicating mobile station so that the mobile station is recorded as being currently located in the service area served by the base station with which the communication takes places, while retaining in the same location record the identity or identities (if present) of at least (n−1) other service area(s) in which the relevant mobile station was previously recorded as being located. (The replacing of the identity of another service area need only be implicit; the identity may continue to be physically present but in an invalidated form, the invalidity being indicated, for example by means of a flag bit).

Such a system enables each mobile station in effect to create its own customised enlarged registration area which consists of n service areas at most and movement within which does not require new registrations and the transmission overhead that would entail. This of course may be at the expense of increased transmission overhead when it is desired to call a given mobile station because more than one base station within the enlarged area may have to be activated to locate the mobile station, but in many circumstances this increased overhead will be more than offset by the reduction in the overhead required for the actual registration procedure. In general, the enlarged registration area will be optimum in this respect if the replaced identity, i.e. the identity of the service area which ceases to be part of the enlarged registration area when a new service area is added to the enlarged service area, is that of the service area within which the relevant mobile station has communicated with a base station least recently of all those service areas the identities of which are stored in its location record. The communications taken into account in this and following respects may be, for example, only those initiated by the relevant mobile station, or may for example also include those initiated elsewhere.

It may of course be the case that the response by a mobile station trying to communicate with a base station which is within communication range will be unsuccessful, for example because the mobile station fails to receive an acknowledgement (implicit or explicit) from the base station, although the base station may be arranged to send such an acknowledgement to complete the communication process. In such a case it may be arranged that a storage operation similar to that which would be carried out by the mobile station in conjunction with a successful or complete communication is still in fact carried out, but the storage now being, for example, at least effectively, of a dummy or null service area identity, so that the location record in the mobile station effectively indicates that a communication has occurred with a base station servicing the dummy or null service area. Such storage of a dummy or null service area identity in the event of a communication response being unsuccessful can ensure that the set of stored actual service area identities at the mobile station is always at least a sub-set of the corresponding set of area identities stored at the control means, even in environments where communications are insecure and, for example, the base station receives the relevant message from the mobile station but the mobile station fails to receive the acknowledgement message sent by the base station in response.

Preferably each mobile station is arranged, when it responds to it not being within communication range by storing a service area identity, and when it communicates with a base station serving a service area the identity of which is currently present in the location record included therein, to maintain an indication that the relevant identity now takes precedence over any other identities which are present and, when the mobile station subsequently responds to it not being within communication range, to retain in the same location record that already present identity which is indicated as currently taking precedence. When the control circuits carry out such an updating, and when a mobile station communicates with a base station serving a service area the identity of which is currently present in that location record included in the control circuits which correspond to the relevant mobile station, the control circuits also maintain an indication that the relevant identity now takes precedence over any other identities present in the relevant location record, and, when the control circuits subsequently carries out the next updating of the relevant location record, to retain in this location record that already present identity which is indicated as currently taking precedence. If this is so the problem of frequent re-registration when a mobile station is roaming near the border between two service areas referred to hereinbefore can be successfully overcome.

When a call is requested to a given mobile station the control arrangement could of course activate all the base stations serving the relevant mobile station's enlarged registration area to call that mobile station simultaneously. However it may be advantageous from the point of view of reducing signalling overhead if the base stations serving the respective service areas are activated in succession until the mobile station is found. In the latter case it is preferable if the order of succession in which the base stations are activated is chosen to be such that the base station(s) serving the service area in which it is most likely that the mobile station is located is/are activated first, then if the mobile station does not respond, the base station(s) serving the service area in which the mobile station is next most likely to be located is/are activated next, and so on. An estimate of the relative likelihoods of the mobile station being located in the various service areas which make up its enlarged service area can be made on the basis of the comparative lengths of time which have elapsed since communications last occurred between it and a base station serving each of the respective said service areas, it being assumed that the mobile station is most likely to be located in the service area in which a communication last occurred, it being next most likely to be located in that one of the other service areas in which a communication next most recently occurred, and so on. An indication of these comparative lengths of time can be obtained if the control arrangement maintains an indication of the current order of precedence, taken on a historical basis, of all the identities currently present in the location record corresponding to the relevant mobile station, and the mobile station does likewise in respect of the location record stored therein in order to enable the contents of the location records at the mobile station and the control means to correspond as far as possible. Preferably, therefore, each mobile station is arranged to maintain an indication of the current order of precedence, taken on a historical basis, of all the identities currently present in the location record included therein and, when the mobile station responds to it not being within communication range by replacing an identity already present in this location record, to replace that identity which is indicated as currently being lowest in said order of precedence. For each location record included therein, the control circuits also maintain an indication of the current order of precedence, taken on a historical basis, of all the identities currently present in that location record and, when they carry out such an updating retain in the relevant location record those $(n-1)$ already present identities which are indicated as currently taking the most precedence.

Each indication of the current order of precedence may take the form of a record of the absolute time which has elapsed since respective ones of the relevant identities last took precedence. Such a record may be either explicit or implicit. Thus, for example, it may be arranged that a timer is provided corresponding to each respective one of the relevant identities, this timer being started either each time the relevant identity takes precedence or ceases to take precedence over any other identities present in the relevant location record. Alternatively, for example, it may be arranged that merely a record is stored of the absolute time at which the relevant identity takes precedence or ceases to take precedence over any other identities present in the relevant location record, this, in conjunction with a clock indicating real time, providing an indication of the absolute time which has elapsed.

As mentioned above, the benefits of the customised enlarged registration area effectively created for each mobile station are offset at least to some extent by the increased signalling which may be required when a given mobile station is called, because more than one base station within the enlarged area may have to be employed in order to contact the mobile station. Preferably, therefore, the enlarged area is not too large, and its size can be tailored to some extent to the behavior of the corresponding mobile station if each mobile station is implicitly de-registered with respect to a given service area should communication not occur between that mobile station and a base station serving that area for a predetermined time. Thus, preferably, each mobile station and the control circuits are arranged to delete any service area identity stored in a location record should the corresponding absolute time which has elapsed exceed a first predetermined value, at least if a least one service area identity will continue to be present in the relevant location record after the deletion. If this is the case then, if desired, each mobile station and the control means may also be arranged, if one service area identity is present in the location record, to also delete that identity should the corresponding absolute time which has elapsed exceed a second predetermined value greater than the corresponding first predetermined value. This also enables a reduction of futile signalling to a mobile station which has in fact roamed completely out of the overall service area of the system or has simply switched off. (The deletions may only be implicit; the relevant identities may continue to be physically present but in an invalidated form, the invalidity being indicated, for example, by means of a flag bit.)

Preferably the base stations are arranged to transmit the given number n to each mobile station. Transmitting the given number n to each mobile station enables the maximum size of the enlarged registration area effectively created for each mobile station to be determined under central control, and changed if desired to be optimum under current conditions. If desired, different values of n can be utilised in different parts of the system.

An embodiment of the invention will be described, by way of example, with reference to the accompanying diagrammatic drawings.

DESCRIPTION OF THE PREFERRED EMBODIMENT

Figure 1:
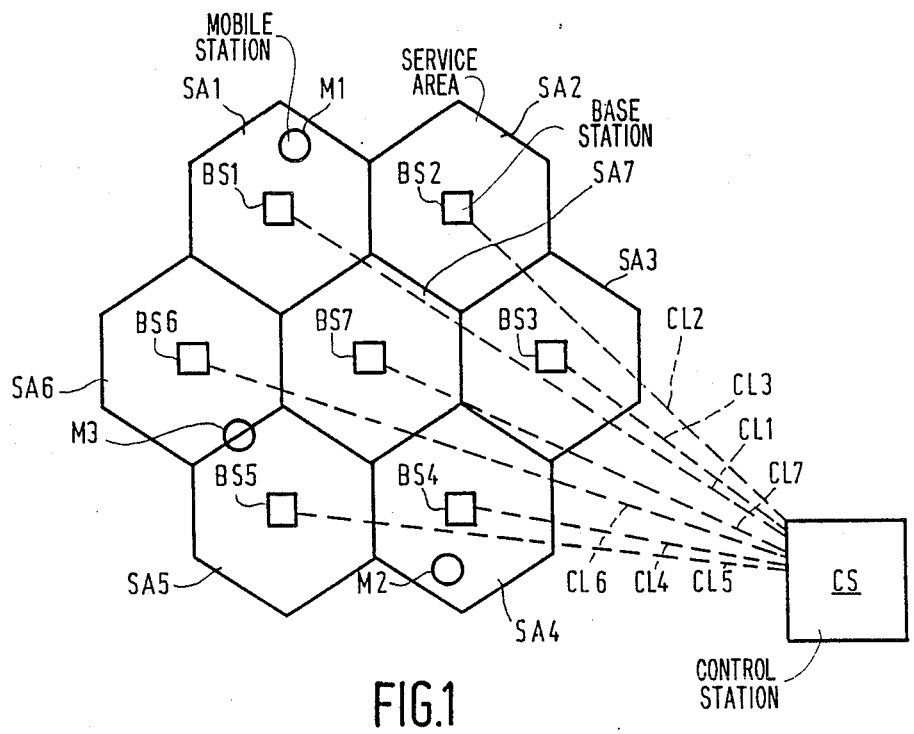
FIG. 1 shows the overall geographical layout of the embodiment.

The drawing shows diagrammatically the overall geographical layout of a mobile radio transmission system in accordance with the invention. The system comprises a plurality of base stations BS of which seven, BS1 . . . BS7, are shown, situated at respective geographical locations. Each of these base stations comprises a radio transmitter/receiver and the respective service area SA1 . . . SA7 of these overlap, to collectively cover the whole area shown. (The service areas are in fact shown as non-overlapping hexagons, for convenience of drawing). A plurality of mobile stations M of which three, M1 . . . M3, are shown, is free to roam throughout the whole area, and indeed outside it. Each of these mobile stations also comprises a radio transmitter/receiver which is capable of communicating with each base station transmitter/receiver when it is within satisfactory communication range of that base station transmitter/receiver, and also means for controlling various operations. The system furthermore comprises control means in the form of a control station CS provided with a two-way communication link, CL1 . . . CL7 respectively, shown in dashed lines, to each base station BS. Each of these communication links may be, for example, a dedicated land-line. The control station CS may, furthermore, be connected to the public switched telephone network (PSTN) to enable communication to take place between a mobile station M and a subscriber to that network, if desired.

When a mobile station M requires to initiate a call, either to another mobile station or to a subscriber to the PSTN, the initial procedure is straightforward. The station M first radios its request to a base station BS within communication range of which it is currently located. Thus, for example, referring to FIG. 1, mobile station M1 will radio its request to base station BS1 whereas mobile station M2 will radio its request to base station BS4. Mobile station M3 will radio its request to either base station BS5 or base station BS6. The receiving base station in turn transmits the request to the control station CS over the relevant communication link CL, and the control station responds by controlling the setting up of the call.

If a call is to a mobile station M, either from another mobile station or from a PSTN subscriber, the called mobile station has to be alerted. If it were not known within which part of the overall geographical area the called mobile station is located this could be done by the control station CS requesting all the base stations BS to radio the relevant request, either simultaneously or sequentially, with all the transmission overhead that would entail. To reduce this overhead, therefore, a registration strategy is employed. Each mobile station M communicates and thereby registers with a base station BS within which it is within communications range, and thereby with the corresponding service area SA, and the relevant base station transmits this fact to the control station CS which stores it, so that when a call is initiated to a given mobile station M control station CS knows within which part of the overall area the call has to be transmitted, enabling the transmission to be confined within this part. (In FIG. 1 station M1 will have registered with service area SA1, station M2 with service area SA4 and station M3 with service area SA5 or service area SA6). If a mobile station M should subsequently roam into another service area SA it may eventually become no longer in communication range of a base station serving a service area with which it is currently registered. Its response to this is to communicate and hence register with another base station BS of which it is then within such range (if any) and thereby with the corresponding service area SA. (The communication may or may not take the form of a specific registration request message; any communication can in fact be arranged to serve as a registration request if desired). Thus, referring to FIG. 1, mobile station M1 may roam into service area SA2 and eventually cease to be within communication range of base station BS1. (It will, however, now be within communication range of base station BS2). Its response to this, if and only if it is not already also registered with service area SA2, is to register with base station BS2 and hence with service area SA2, and base station BS2 transmits this fact over link CL2 to control station CS, which stores it in a location record corresponding to the relevant mobile station, so that control station CS knows the modification which has to be made to that part of the overall area within which a call to the mobile station M2 has to be transmitted. The operations described so far are in accordance with known techniques. However, in contradistinction to the known techniques, when mobile station M1 registers with service area SA2 it remains registered with at least one other service area SA with which it is already registered (if any). This may be, for example, the service area SA1, in which case both mobile station M1 and control station CS retain in their location records the information that station M1 is registered with service area SA1 in addition to the information that station M1 is now also registered with service area SA2. Now when a call is requested to station M1 control station CS either instructs both base station BS1 and base station BS2 (at least) to transmit this call simultaneously or instructs one of these stations, preferably that one with which M1 most recently communicated, to transmit the call, and then the other of these stations to transmit the call if there is no response to the first. This means of course that sometimes the call may have to be transmitted by more base stations than would have to do so in the known systems employing registration, but even so the number of base stations transmitting the call can still be considerably less than the total, the number of service areas with which each base station BS can be registered being limited (see below). However, now if mobile station M1 should roam back into service area SA1 and eventually cease to be in communications range of base station BS2 its response to this will be to take no action, because it is now within communications range of base station BS1, and it is still registered with the corresponding service area SA1. Thus the transmission overhead which would be incurred in the known systems employing registration by re-registration with service area SA1 is dispensed with; mobile station M1 has effectively created for itself a customised enlarged registration area comprising the service areas SA1 and SA2. The effect of this is particularly beneficial if the mobile station M1 should repeatedly roam across the border between the service areas SA1 and SA2.

As mentioned above, the maximum number n of service areas SA with which each mobile station M can be registered at any given time is limited. (If desired, this number may be broadcast to each mobile station by all the base stations BS, or to each mobile station each time it registers with a service area, under the control of control station CS, so that it can be changed at any given time if conditions warrant it.) Each mobile station M stores the identities of the service areas in which it has made registration requests, and information about their chronological order, in a location record and, if registration of a given mobile station with a new service area SA would result in the number of stored identities exceeding n, the "oldest" stored identity is deleted, i.e. the mobile station is implicitly (there being no actual transmission of this fact by the mobile station) deregistered with respect to the service area whose identity is deleted. The "chronological order" will be basically the order in which the mobile station registers with each service area, but modified if necessary to take into account the occurrences of communications between the mobile station and base stations serving the various service areas with which it is registered. Each time a communication occurs between the mobile station and a base station serving a particular service area the identity of that service area is promoted to be treated as the most recent in the chronological order. In the present example the information about the chronological order is stored in the form of the actual times of the respective registrations, which times are where appropriate replaced by the actual times at which subsequent communications occur. Control station CS stores in the location record corresponding to the mobile station information similar to, and ideally identical to, the information stored in the mobile station's own location record.

If there is no communication between a given mobile station M and a base station BS serving a service area SA with which the mobile station is registered for a long time it can be beneficial to the system as a whole in respect of transmission overhead to assume that the mobile station is unlikely for some time to roam back into that service area. To this end, each mobile station M is arranged to delete from its service area registration record the identity of any service area for which no communication between the mobile station and a base station serving that area has occurred for a predetermined time (which predetermined time may or may not be the same for each said identity), at least if at least one identity will remain stored after the deletion. In other words, in such a situation the mobile station is implicitly (there again being no actual transmission of this fact by the mobile station) deregistered with respect to the relevant service area automatically, thereby reducing the size of its own registration area. This feature can also be beneficial if a given mobile station roam outside the overall geographical area covered by the service areas SA for some reason. In these circumstances it may eventually cease to be within communications range of any of the base stations BS (in which case it will of course fail to register with a new service area SA). If this situation should persist it will eventually also deregister in turn with respect to at least all but one of the service areas SA with which it is already registered, which is obviously desirable because it cannot be reached by a call anyway. (It is preferable although not essential to retain registration with one service area SA, at least for a time which is substantially longer than the predetermined times after which the identities of the other service areas are deleted, for example to avoid a flood of registration requests at the start of the working day). If a service area with respect to which the mobile station deregisters is in fact the one in which it is currently located it will obviously have to be arranged to immediately re-register.

As mentioned above, control station CS contains a location record corresponding to each of the mobile stations M, and each time a given mobile station registers with a new service area the relevant record is updated in response to the resulting information transmitted to the control station by the relevant base station BS, so that ideally each location record at the control station always corresponds to the record at the relevant mobile station. Maintaining this correspondence is possible, at least in theory although in practice some lack of correspondence may arise due to incomplete communications, because it is known at the control station what the other criteria are which govern the updating of the records at the mobile stations (the number n, the chronological order, the modifications to the chronological order, the deletion of identities after a predetermined time at least if at least one will remain) and also when each mobile station M has communications with a particular base station BS. If the control station deletes an identity because no communication has occurred between the relevant mobile station and a base station serving the relevant area for a predetermined time it is preferably arranged that this occurs slightly after the corresponding deletion at the mobile station, to enable the mobile station to reregister, if it is in fact located in the relevant service area, before the deletion actually occurs at the control station. Otherwise there could be short period of time when it appears at the mobile station that it is registered but the control station is in fact failing incoming calls for that mobile station.

When a call is requested to a given mobile station M, the control station CS may, for example, control each base station BS which serves an area SA with which the mobile station M is currently registered to call the mobile station simultaneously. This will obviously minimise the time taken to actually locate the relevant mobile station. However it may be advantageous from the point of view of minimising the signalling overhead to instead arrange that the control station controls these base stations to call in succession until the mobile station responds. In the latter case the succession preferably corresponds to the reverse of the chronological order, the base station(s) serving the area SA in which the relevant mobile station has last communicated with a base station being controlled to call first.

Although each service area in the drawing is shown as being served by a single base station BS this is not necessarily the case. Each service area may be served by more than one such base station, which base stations may or may not transmit identical information.

Each mobile station M may determine whether or not it is within communication range of a base station by, for example, monitoring the signal strength of the transmissions from that base station to determine whether or not it lies above a predetermined threshold. The monitored transmissions may be, for example, control signals which in many systems will be transmitted over dedicated control channels and consist of command messages, acknowledgement messages etc. for the various mobile stations and contain information identifying the transmitting base stations. If the nature of the monitored transmissions allow it an alternative or additional criterion on which such a determination can be based is the rate at which errors occur in the transmissions as received.

Although the system described includes control means in the form of a single control station CS which is separate from the various base stations and communicates with them via respective direct two-way links CL this is not essential. The control means functions described may be distributed over a plurality of control stations which communicate with one another and with the base stations either directly or via base stations and/or control stations. Moreover a control station can be co-located or even coincident with a base station if desired.

Some elements of an example of a system as described with reference to FIG. 1 will now be described in more detail with reference to FIGS. 2 to 10 of the drawings. For convenience it will be assumed that the system operates in accordance with a signalling protocol as described in a paper by P. J. Mabey, D. M. Ball and D. J. Harrison entitled "UK Trunking System Signalling Standard-Protocol Aspects" in the Journal of the IERE, May/June 1987, pages 119-124, although this is not necessarily the case. In accordance with this protocol the base stations BS of FIG. 1 each transmit on a substantially continuous basis a succession of data codewords on a "forward" (radio) control channel, these codewords normally being so-called control channel system codewords and other codewords, transmitted alternately. In the system of the present example a bit field of each control channel system codeword transmitted by each base station BS constitutes an identifier AREA of the particular service area SA served by the relevant base station. Thus, if a mobile station M tunes its radio receiver to the control channel corresponding to a base station BS with which it is within communications range it will receive repeatedly a code indicative of the particular service area SA served by that base station. The "other" codewords, which each contain an address field, may constitute messages addressed to all, particular ones, or groups of the mobile stations M, each such mobile station being assigned a unique address which is stored therein for reference. Moreover, many of the codewords transmitted by each base station constitute an invitation to all, particular ones, or groups of mobile stations within communication range to transmit to the base station a message codeword on a "return" control channel within a randomly chosen one of a number of immediately succeeding time slots, which number is contained in a further bit field of the invitation codeword. This communication technique is described, for example, in GB-B-2 069 799 to which U.S. Pat. No. 4,398,289 corresponds. The message codeword transmitted by a given mobile station M contains the unique address of that station and may constitute, for example, a request for service. The signalling on the forward and return control channels (the signalling on the forward channel being under the control of the control station CS) may be employed, for example, to set up a communications channel between a pair of mobile stations via the base station(s) with which they are within communications range.

Figure 2:
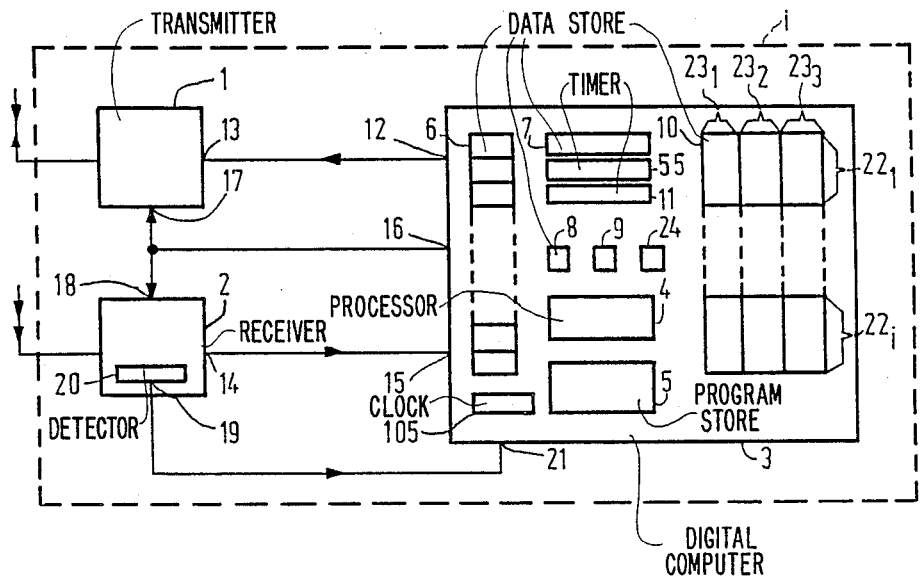
FIG. 2 is a block diagram of relevant parts of a mobile station.

FIG. 2 is a block diagram of those portions of a possible construction for each mobile station Mi which are relevant to the present invention. The station Mi comprises a transmitter portion 1, a receiver portion 2 and a digital computer system 3. The system 3 includes, in addition to the conventional processing units(s) 4 and program store 5, data storage means 6, 7, 8, 9, 24 and 10, timers 11 and 55, and a real-time clock 105. A serial data output port 12 of the system 3 is connected to a modulation signal input 13 of the transmitter portion 1 and a demodulated signal output 14 of the receiver portion 2 is connected to a serial data input 15 of the system 3. A parallel data output port 16 of the system 3 is connected to tuning control inputs 17 and 18 of the transmitter and receiver portions 1 and 2 respectively. The output 19 of a received signal-level threshold detector 20 included in the receiver portion 2 is connected to a further signal input 21 of the system 3.

Storage means 6 stores a list of all the radio channels employed in the communications system, each "forward" channel being stored in conjunction with the corresponding "return" channel. Storage means 7 stores the address of the relevant mobile station Mi. Storage means 8, 24 and 9 store a parameter m, a parameter p and the aforesaid parameter n, respectively. Storage means 10 constitutes the aforesaid location record, service area identities being stored in the respective fields $22_1, \ldots 22_i$. Fields $23_1$, $23_2$ and $23_3$ of each field 22 store the actual service area identity, a control channel number and a time respectively.

System 3 is programmed to decode the digital words applied by receiver portion 2 to its input 15 and suitably react if appropriate, and also to format digital words and apply them to its output 12 for transmission by the transmitter portion 1 when appropriate. (The manner in which this decoding and formatting is carried out is conventional, and will not be elaborated upon here as it is irrelevant to the present invention.) It is also programmed to apply to its parallel output 16 a digital word for tuning the transmitter and receiver portions to the return and forward channel frequencies respectively corresponding to any of the channels stored in store 6. (The program may in fact consist of a plurality of interacting and concurrently running cyclic programs for a corresponding number of processing units). The program or one of the concurrently running programs includes the steps shown in the flow chart of FIG. 3 in which the various blocks have the following significances.

25—START.

26—Initialise, including set parameter n in storage location 9 to unity and tune transmitter 1 and receiver 2 to the frequencies of the channel stored in the first location of store 6.

27—Does the signal at output 19 of detector 20 indicate that the received signal strength is above the threshold?

Figure 4:
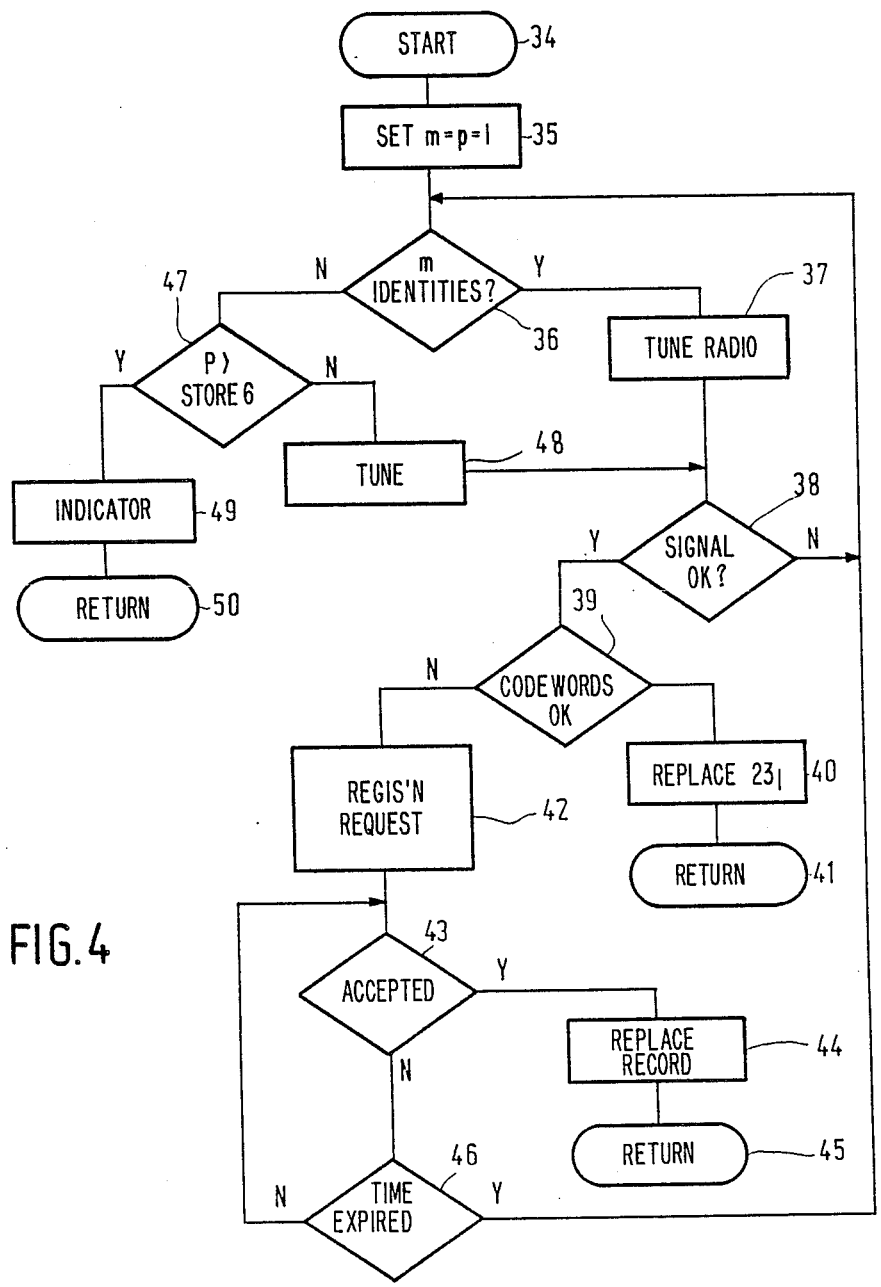

28—Call control channel search subroutine (FIG. 4).

29—Has a new n-value-determining instruction been received?

Figure 5:
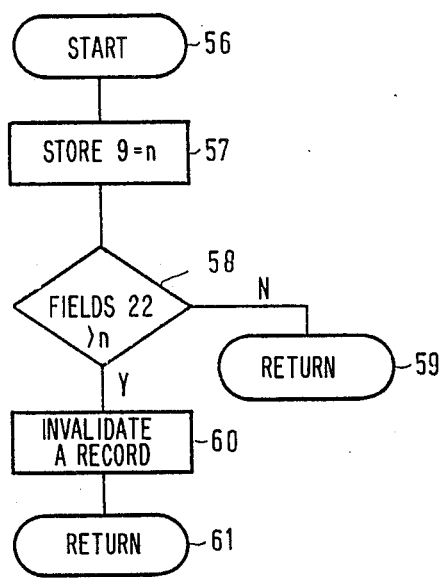

30—Call write subroutine for storage location 9 (FIG. 5).

31—Is the difference between the time stored in the field $23_3$ of a valid (i.e. not already invalidated) service area or null (see subsequently) registration record present in a field 22 of store 10 and the current time indicated by clock 105 greater than a first predetermined value?

Figure 6:
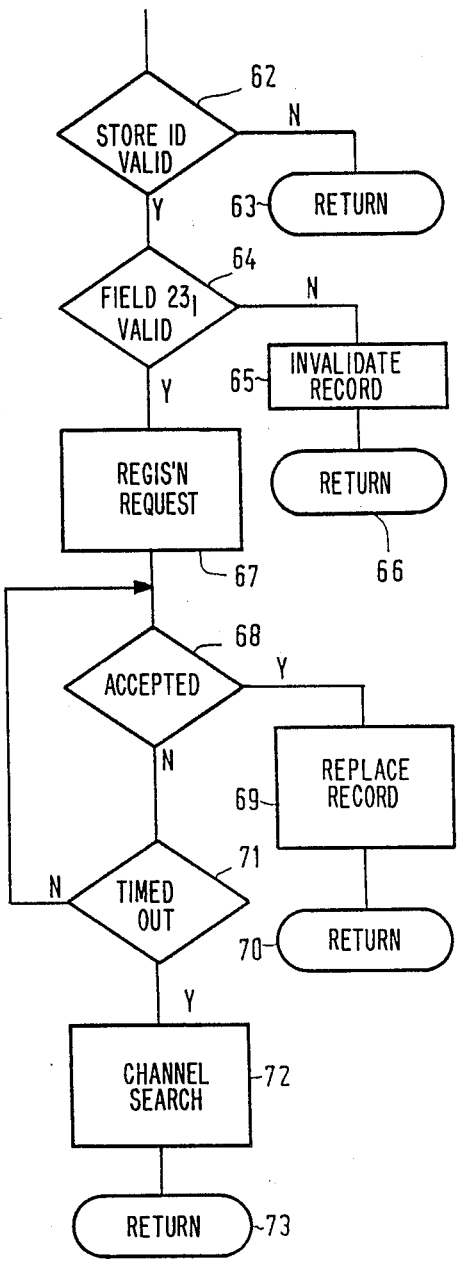

32—Call expired registration or null record servicing subroutine (FIG. 6).

106—Is the difference between the time stored in the field $23_3$ of a valid record present in a field 22 of store 10 and the current time indicated by clock 105 greater than a second predetermined value greater than the first?

107—Invalidate the relevant record.

33—Has a new registration renewal response (see below) been received?

Figure 7:
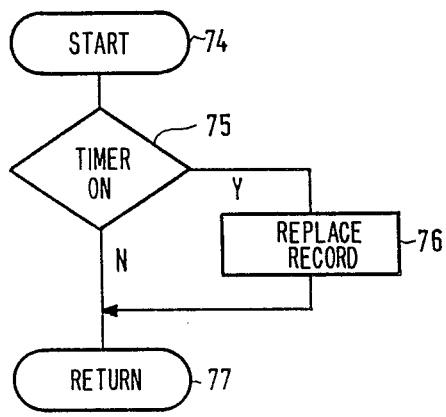

51—Call registration renewal subroutine (FIG. 7).

52—Has registration renewal timer (see below) newly expired.

Figure 8:
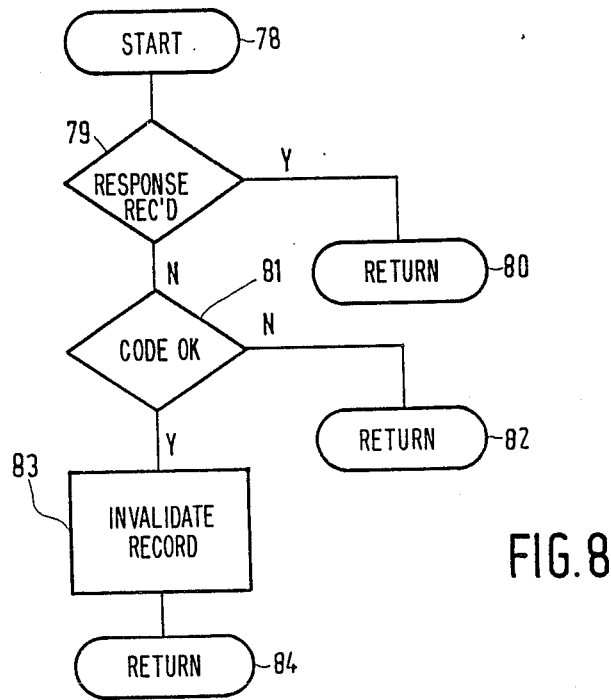

53—Call registration renewal timer expiry subroutine (FIG. 8).

54—Other operations (if desired).

Thus, after start up of the mobile station, the transmitter and receiver are tuned to one of the control channels of the system and the parameter n is set to a default value of unity to await a message from a base station indicating what it should be. If the control channel signal strength is unsatisfactory a search is made to find another control channel for which this is not the case. After this the parameter n is set to the correct value if an appropriate instruction has been received, suitable action is taken if a registration record has expired, the sole remaining registration record is invalidated if it is sufficiently "old" and any necessary action is taken if a registration renewal situation is present, after which the program returns to the signal strength test, possibly with the interposition of further processing steps.

The flow chart of FIG. 4 indicates the control channel search subroutine 28 performed if it is determined in test 27 that the signal strength of the current channel is unsatisfactory. In FIG. 4 the various blocks have the following significances.

34—START

35—Set parameters m and p to 1.

36—Are there at least m valid service area identities stored in location record 10?

37—Tune transmitter 1 and receiver 2 to the frequencies of the channel stored in the field $23_2$ of the mth record 22m in storage means 10. Increment m.

38—Does the signal at output 19 of detector 20 indicate that the received signal strength is above the threshold?

39—Are control channel system codewords being received in which the identifier AREA corresponds to that stored in a field 23 of a valid one of the records 22 in storage means 10?

40—If the channel stored in the field $23_1$ of the relevant one of the records 22 is different from that to which the transmitter and receiver portions 1 and 2 are currently tuned replace the former by the latter.

41—RETURN

42—Generate at output 12 a registration request message for transmission by transmitter 1 to the relevant base station. Write a null record (see below) containing the time at which the message is actually transmitted (read from clock 105) into a field 22 of storage means 10 which does not contain a valid record or, if this would result in a number of valid records in storage means 10 which exceeds the parameter n currently contained in storage means 9, overwrite that valid record the contents of the field $23_3$ of which contain the least recent time. Start timer 11.

43—Has "registration accepted" message been received?

44—Replace the null record written in step 42 by a registration record containing the relevant AREA code, the relevant channel number, and the time written when the null record was written.

45—RETURN

46—Has timer 11 expired?

47—Is parameter p greater then the number of channels (pairs of forward and return) stored in storage means 6?

48—Tune transmitter 1 and receiver 2 to the frequencies of the pth channel stored in storage means 6. Increment P.

49—Energise indicator to user that registration attempt has failed.

50—RETURN

The effect of the subroutine of FIG. 4 is therefore to test various channels in turn for satisfactory signal strength, starting with valid ones of those stored in storage means 10 and continuing, if necessary, with those stored in storage means 6. If such a channel is found then, if the received AREA identification corresponds to a valid identification stored in any field $23_1$ of storage means 10, a return is made at 41, changing the channel stored in the relevant field $23_2$ to the one to which the mobile station is currently tuned, if necessary. On the other hand, if such a channel is found but the received AREA identification does not correspond to a valid identification stored in any field $23_1$ of storage means 10, an attempt is made in step 42 to register in the new area. If this attempt is successful ("yes" output Y from test 43) a return is made at 45 after the null record entered in storage means 10 in step 42 has been converted to an actual registration record for the new area. (The "null records" are dummies created to assist in ensuring that all actual service area registration records at each mobile station have, at any given time, counterparts at the control station CS, it being possible, for example, for a registration request to be received at the base station but the resulting "registration accepted" message sent by the base station not being received by the relevant mobile station.) If the registration attempt fails, and timer 11 times out before a registration message is received (result Y from test 46) the null record is maintained and the transmitter and receiver are tuned to the next control channel. If all channels are tried, without one being found of sufficient signal strength and for which the relevant and valid AREA code is stored in storage means 10 or on which a registration attempt has succeeded, the user is alerted in step 49 and a return is made at 50. Whether or not a field 22 contains a valid record may be indicate, for example, by means of a stored flag bit corresponding to each field. Alternatively, an invalid record may be positively deleted rather than being merely implicitly deleted by changing the flag.

The flow chart of FIG. 5 indicates the write subroutine 30 for storage location 9 which is performed when it is determined in test 29 that a new n-determining instruction has been received over the control channel to which the mobile station is currently tuned. Such an instruction may be broadcast by the base stations BS, under the control of the control station CS, to all mobile stations M when it is required to change the value. In FIG. 5 the various blocks have the following significances.

56—START.
57—Overwrite current contents of storage location 9 with received value of n.
58—Is the number of valid records in the fields 22 of storage means greater than the number n in location 9?
59—RETURN.
60—Invalidate a sufficient number of the valid records so that only n remain, the invalidated records being those for which the field $23_3$ contains the least recent time.
61—RETURN.

Thus the current contents of location 9 are replaced by the newly received value for n (the maximum value of which may be, for example, three). If this results in storage means 10 containing more than n valid records a sufficient number of the "oldest" are invalidated, i.e. implicitly deleted to ensure that exactly n remains.

The flow chart of FIG. 6 indicates the subroutine 32 which is performed when it is determined in test 31 that an otherwise valid record in storage means 10 has expired, i.e. when it is determined that the difference between the time stored in the field $23_3$ of the relevant record and the current time exceeds a first predetermined value, for example 30 minutes. In FIG. 6 the various blocks have the following significances.

62—Does storage location 10 contain a valid and unexpired non-null registration record?
63—RETURN.
64—Does the AREA code in the field $23_1$ of the newly expired registration or null record correspond to that currently being received?
65—Invalidate newly expired service area or null registration record.
66—RETURN.
67—Generate at output 12 a registration request message for transmission by transmitter 1 on the current control channel. Write a null record containing the time at which the message is actually transmitted into the field 22 of store 10 which currently contains the newly expired record. Start timer 11.
68—Has a "registration accepted" message been received?
69—Replace the null record written in step 67 by a registration record containing the relevant AREA code, the relevant channel number, and the time which was included in the null record.
70—RETURN.
71—Has timer 11 expired.
72—Call the control channel search subroutine 28 (FIG. 4).
73—RETURN.

Thus, when it is determined that the time in the field $23_3$ of a registration or null record contained in store 10 has not been changed for a predetermined time, i.e. the record has been present for the predetermined time without being renewed, the relevant record is processed provided that at least one valid and unexpired non-null registration is also present in the store. The service area or null registration is invalidated if it is for an area which does not correspond to that in which the mobile station is currently situated. If it does so correspond an attempt is made to re-register in the current area. Such an attempt may or may not succeed. If it does not succeed a search operation is carried out for a new control channel.

In principle, the time in the field $23_3$ of a given valid registration record is updated each time a communication occurs between the mobile station and a base station serving the relevant area. (The communications which give rise to the updating may be, for example, only those initiated by the mobile station, or both those initiated by the mobile station and those initiated by the base station, it being necessary if the system is to be secure, that in all cases the complete communication contains both a communication from the mobile station to the base station and a subsequent related communication from the base station to the mobile station). In the present embodiment the updating is triggered by the sending by the mobile station of a particular message (other than a registration request) which demands a response within a predetermined time (timed by timer 55), this message being chosen to be one which is always sent in the course of a communication initiated by the mobile station, for example a request for service message. Computer system 3 is programmed to, each time such a message is sent, start timer 55, create a null record in store 10 (the field $23_3$ of the null record containing the time at which the message was actually sent) and invalidate the oldest record in store 10 if store 10 would otherwise contain more than n valid records. The tests 33 and 52 of FIG. 3 then determine whether the demanded response is actually received.

FIG. 7 is a flow chart of the registration renewal subroutine 51 which is performed when test 33 determines that a "renewal response" message has been newly received. In FIG. 7 the various blocks have the following significances.

74—START.
75—Is timer 55 running?
76—Replace the time in the field $23_3$ of the registration record of the area in which the mobile is currently operating by the time in the null record created when the response-demanding message was sent. Invalidate the null record created when the response-demanding message was sent and revalidate the record (if any) which was invalidated at that time.
77—RETURN.

FIG. 8 is a flow chart of the subroutine 53 which is performed when test 52 determines that timer 55 has newly expired. In FIG. 8 the various blocks have the following significances.

78—START.
79—Was a registration renewal response received while the timer 55 was running?
80—RETURN.
81—Does the AREA code in the control channel system codewords currently being received correspond to that in that one of the fields 22 of store 10 which contains the most recent time in its field $23_3$?
82—RETURN.
83—Invalidate the null record created when the response-demanding message was sent and revalidate the record (if any) which was invalidated at that time.

84—RETURN.

It will be seen from FIG. 7 and 8 that, if a renewal response message is received within the correct time, the contents of store 10 are restored to what they were before the demand message was sent, with the exception that the time in the relevant registration record is updated. If such a response message is not received then, if the AREA code currently being received corresponds to that in the registration record which contains the most recent time the contents of store 19 are restored to what they were before the demand message was sent, whereas if it does not so correspond, the null record is maintained.

Figure 3:
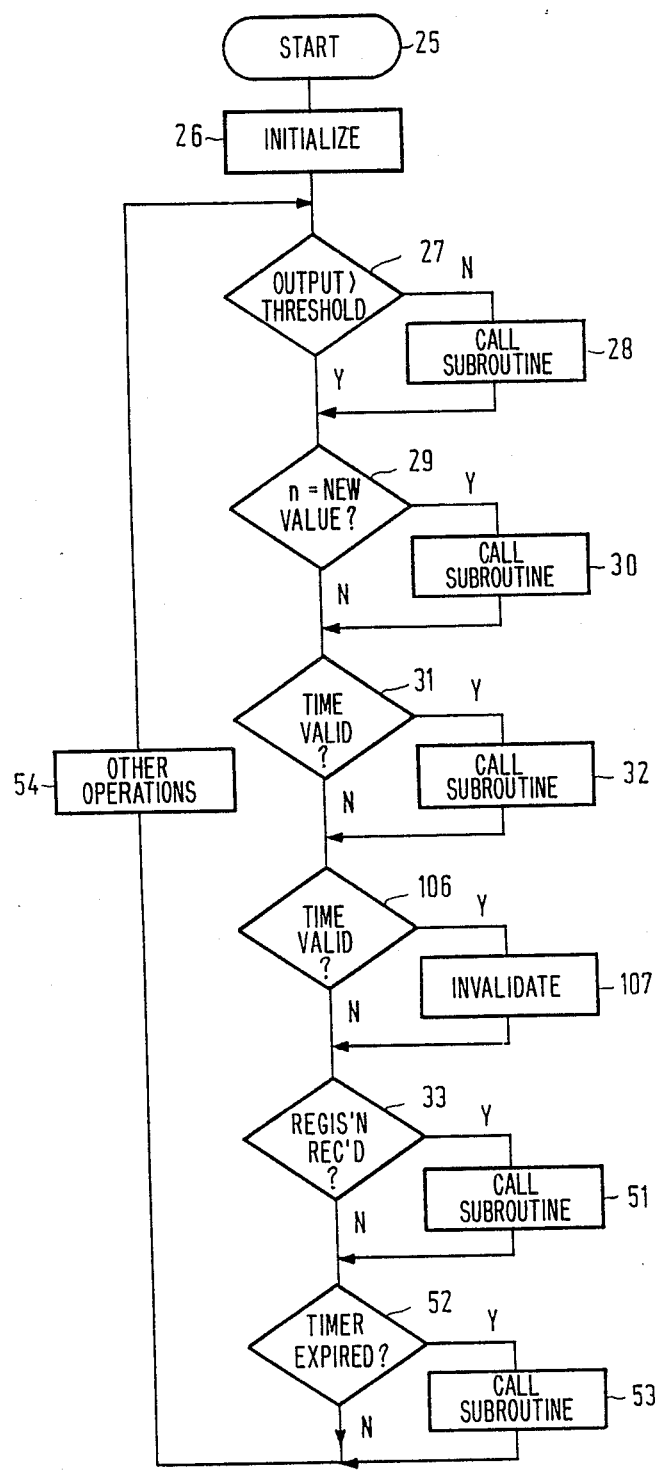
FIGS. 3, 4, 5, 6, 7 and 8 are flow charts illustrating the operation of the mobile station of FIG. 2.

Although the various tests of FIG. 3 are shown as being included in the same cyclic program, it will be evident that this is not necessarily the case. Each of these tests, or groups of these tests, may be included in respective ones of concurrently running cyclic programs.

Figure 9:
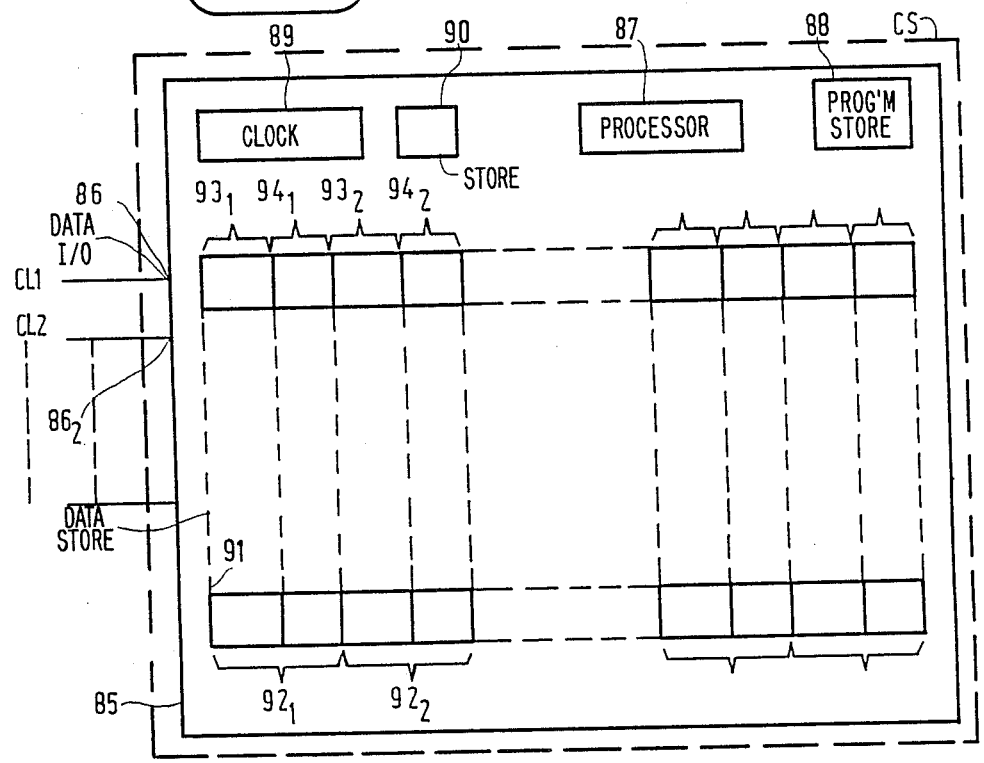
FIG. 9 is a block diagram of relevant parts of a control station.
Figure 10:
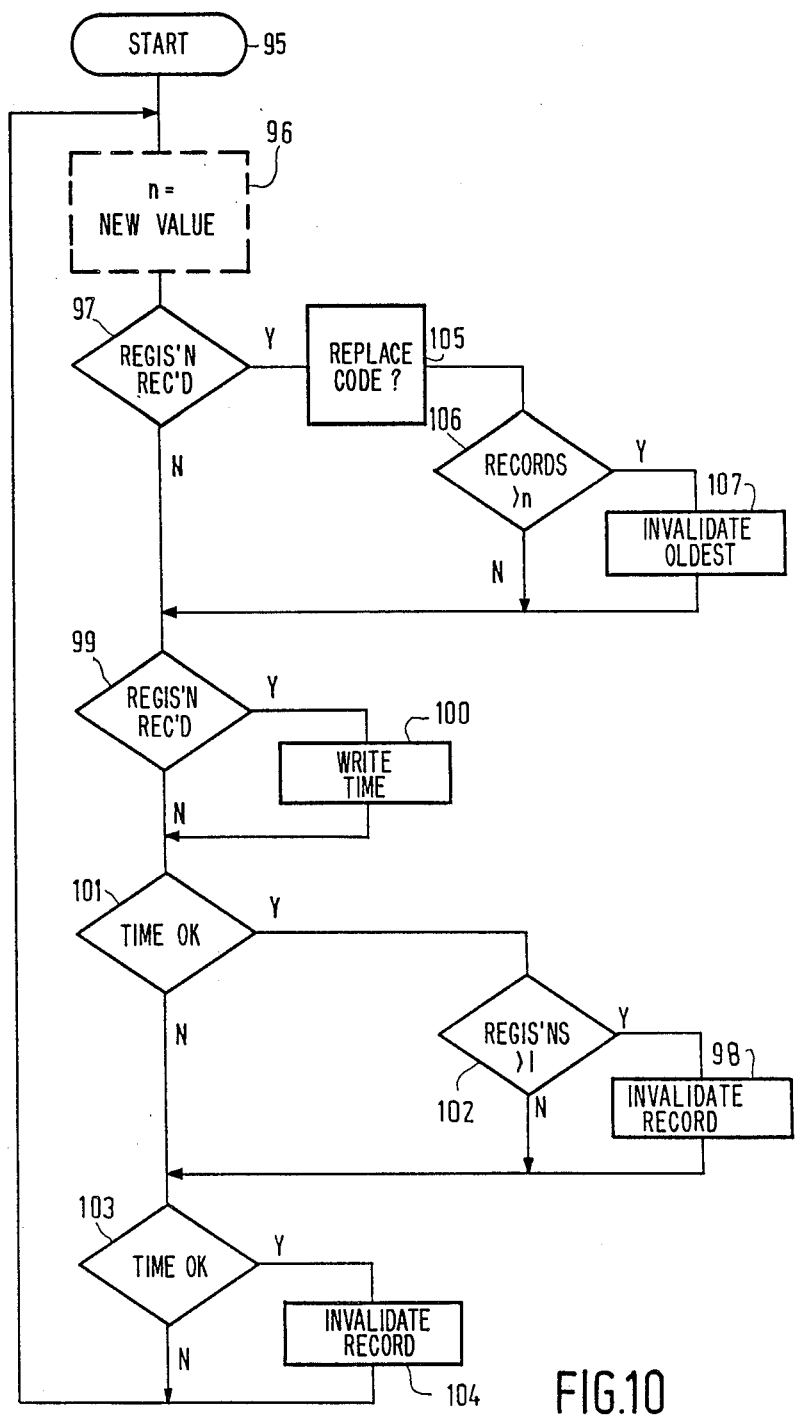
FIG. 10 is a flow chart illustrating the operation of the control station of FIG. 9.

FIG. 9 is a block diagram of a possible construction for the control station CS of FIG. 1, only those parts being shown which are relevant to the present invention. (It will be assumed for simplicity that each base station BS acts merely as a transmitter for information received from the control station CS over the corresponding link CL and as a receiver for information for the control station, the latter being sent by the base station over the corresponding link. In practice, however, some of the requisite data processing will normally be carried out at each base station BS). The control station CS comprises a computer system having a data input/output 86 corresponding to and coupled to each link CL in FIG. 1. In addition to the conventional processing unit(s) and program store(s) 87 and 88, system 85 comprises a real-time clock 89, a storage location 90 and further data storage means 91. A respective field 92 of storage means 91 is assigned to each mobile station M and is capable of storage a plurality of registration records. The storage location for each record comprises a subfield 93 for an AREA code and a subfield 94 for a time.

In addition to despatching the aforesaid alternate control channel system codewords and other code words along each link CL, system 85 is programmed to react to the reception of any registration request or registration renewing message received at an input/output 86 by storing this message together with the time of its receipt (read from clock 89) and a code indicating at which input/output 86 it was received. It is furthermore programmed to perform the steps indicated in the flow chart of FIG. 10, in which the various blocks have the following significances.

95—START

96—Supply an n-value-determining instruction message to the outputs 86 for transmission by the base stations. Write the relevant value of n into location 90. If the new value of n results in any field 92 containing more than n valid registration records invalidate a sufficient number of these records to ensure that exactly n remain, the invalidated records being those which contain the least recent times in their subfield 94. (This block is shown in broken lines because in practice it will only be performed infrequently, for example in response to activation by an operator).

97—Has a registration request message been newly received?

105—If the AREA code corresponding to the input/output 86 on which the message was received is not already present in a subfield 93 of that field 92 of storage means 91 which corresponds to the mobile station M from which the message was received, write this AREA code into a free subfield of said field 92 and the time the message was received into the corresponding subfield 94. (A "free" subfield is one which does not contain a valid registration record). Otherwise merely replace the content of the field 94 corresponding to the field 93 in which the AREA code is already present by said time. Supply a "registration accepted" message to the relevant input/output 86 for transmission by the relevant base station BS.

106—Does the number of valid records in the relevant field 92 exceed the value of n in location 90?

107—Invalidate that record in the relevant field 92 which contains the earliest time in its subfield 94.

99—Has a registration-renewing message been newly received?

100—Write the time the message was received into a subfield 94 of the field 92 assigned to the mobile station M from which the message was received, this subfield being that for which the contents of the associated subfield 93 correspond to the AREA code for the particular input/output 86 on which the message was received. Supply the appropriate response message to the relevant input/output 86.

101—Does the difference between the time in the subfield 94 of any valid registration record in store 85 and the current time in timer 89 exceed a value slightly greater than the aforesaid first predetermined value?

102—Does the relevant field 92 contain more than one valid registration record?

98—Invalidate the relevant registration record.

103—Does the difference between the time in the subfield 94 of any valid registration record in store 85 and the current time in timer 89 exceed a value slightly greater than the aforesaid second predetermined value?

104—Invalidate the relevant registration record.

Thus the control station reacts to the receipt of registration requesting messages and registration renewing messages in an appropriate way to ensure that, ideally, the valid records in each field 92 will correspond to those in the relevant mobile station, time-out of the various records taking place on the same criteria in both the mobile stations and the control station but with the control station reacting to the expiry of slightly longer times than those to which the mobile stations react.

When a request is received at the control station for a communication to one of the mobile stations it is programmed to refer to the field 92 assigned to the relevant mobile station and determine therefrom that valid AREA code for which the time in the corresponding subfield 94 is the most recent. It then supplies a response-demanding message, addressed to the relevant mobile station, to that one of the inputs/outputs 86 which corresponds to the AREA code so determined, and waits for a response. If no response is received it refers once again to the relevant field 92 and determines therefrom that AREA code for which the time in the corresponding subfield 94 is the next most recent, and supplies a suitably addressed response-demanding message to the corresponding one of the inputs/outputs 86, and so on, until a response is eventually received or until all the areas validly recorded in the relevant field 92 have been tried.

From reading the present disclosure, various modifications will be apparent to persons skilled in the art. Such modifications may involve other features which are already known in the design, manufacture and use of systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A mobile radio transmission system comprising:
    a plurality of receiving and transmitting base stations situated at respective geographic locations, defining a plurality of respective service areas;
    a plurality of mobile stations, each including means for transmitting a registration identification and communicating by two-way radio with each base station when in communication range of that base station; and
    control means including a station location record store corresponding to each mobile station, for storing a respective service area identity responsive to receipt at a base station of a registration identification transmitted by the corresponding mobile station,
    characterized in that each mobile station comprises
        means for storing a mobile location record capable of storing at least n service area identities, where n > 1,
        means for determining if the number of service area identities currently stored in that mobile location record equals n,
        means for sensing when that mobile station is not within communication range of any base station serving a service area whose identity is currently stored in that mobile location record,
        means responsive to said means for sensing, when that mobile station is not within such range, for attempting to communicate with another base station having another service area identity, which may be within range; and upon communicating with said another base station, for replacing a service area identity already stored in said mobile location record with said another service area identity if n service area identities were already stored in said mobile location record, and otherwise storing said another service area identity in said mobile location record, and said control means further comprises
    means for storing n different service area identities in each location record, responsive to receipt of registration identification signals by respective base stations from respective mobile stations, and
    means for responding to such communicating with said another base station by updating the contents of the station location record for the corresponding mobile station such that the corresponding mobile station is recorded as being currently located in said another service area; and for replacing a service area identity already stored in said station location record with said another service area identity if n service area identities were already stored in said station location record, and otherwise storing said another service area identity in said station location record while retaining the service area identities already stored.

2. A system as claimed in claim 1, wherein each mobile station includes means for indicating that a given one of a plurality of base stations, whose service area identities are stored in said mobile location record, takes precedence over other such identities which are stored in that record, and upon communicating with said another base station responsive to said means for sensing, indicating that said another service area identity now takes precedence, and
    said control means comprises means, responsive to such updating of the contents of a station location record to record that said corresponding mobile station is currently located in another service area, for maintaining an indication that said another service area identity takes precedence over any other identities present in the corresponding station location record.

3. A system as claimed in claim 2, wherein each mobile station comprises mobile precedence means for maintaining an indication of the current order of precedence, taken on a historical basis, of all the identities currently present in the mobile location record included therein; and, upon such communicating with such another base station when n service area identities were already stored, replacing that previously stored service area identity which is lowest in said order of precedence, and
    said control means comprises station precedence means for maintaining an indication of the current order of precedence, taken on a historical basis, of all the service area identities currently present in the station location record included therein; and, upon such communicating with such another base stations when n service area identities were already stored, replacing that previously stored service area identity which is lowest in said order of precedence and retaining in the respective location record those identities already present which were then indicated as having the most precedence.

4. A system as claimed in claim 3, wherein said mobile and station precedence means each comprise means for recording the absolute times elapsed since the respective ones of the service area identities last took precedence.

5. A system as claimed in claim 4, wherein each mobile station and said control means comprise respective means for deleting any service area identity stored in the respective location record for a corresponding absolute elapsed time which exceeds a first predetermined value, provided that at least one service area identity will continue to be present in the respective location record after the deletion.

6. A system as claimed in claim 5, comprising means for deleting any service area identity whose respective elapsed time exceeds a second predetermined value.

7. A system as claimed in claim 6, wherein each base station comprises means for transmitting the value of the number n to each mobile station within range.

8. A system as claimed in claim 1, wherein each mobile station and said control means comprise respective means for deleting any service area identity stored in the respective location record for a corresponding absolute elapsed time which exceeds a first predetermined value, provided that at least one service area identity will continue to be present in the respective location record after the deletion.

9. A system as claimed in claim 8, comprising means for deleting any service area identity whose respective elapsed time exceeds a second predetermined value.

10. A system as claimed in claim 9, wherein each base station comprises means for transmitting the value of the number n to each mobile station within range.

11. A system as claimed in claim 1, wherein each base station comprises means for transmitting the value of the number n to each mobile station within range.

12. A mobile radio station for communication with a plurality of receiving and transmitting base stations situated at respective geographic locations, defining a plurality of respective service areas, comprising means for storing a mobile location record capable of storing at least n service area identities, where n > 1, means for determining if the number of service area identities currently stored in that mobile location record equals n, means for sensing when that mobile station is not within communication range of any base station serving a service area whose identity is currently stored in that mobile location record, and means responsive to said means for sensing, when that mobile station is not within such range, for attempting to communicate with another base station having another service area identity, which may be within range; and upon communicating with said another base station, for replacing a service area identity already stored in said mobile location record with said another service area identity if n service area identities were already stored in said mobile location record, and otherwise storing said another service area identity in said mobile location record.

13. A station as claimed in claim 12, wherein each mobile station includes means for indicating that a given one of a plurality of base stations, whose service area identities are stored in said mobile location record, takes precedence over other such identities which are stored in that record; and upon communicating with said another base station responsive to said means for sensing, indicating that said another service area identity now takes precedence.

14. A station as claimed in claim 13, wherein each mobile station comprises mobile precedence means for maintaining an indication of the current order of precedence, taken on a historical basis, of all the identities currently present in the mobile location record included therein; and, upon such communicating with such another base station when n service areas were already stored replacing that previously stored service area identity which is lowest in said order of precedence.

15. A method of operating a mobile radio transmission system comprising a plurality of receiving and transmitting base stations situated at respective geographic locations, defining a plurality of respective service areas; a plurality of mobile stations, each including means for transmitting a registration identification and communicating by two-way radio with each base station when in communication range of that base station; and control means including a station location record corresponding to each mobile station, for storing a service area identity responsive to receipt at one base station of a registration identification transmitted by the corresponding mobile station, comprising the steps of:

sensing when a given mobile station is within communication range of a first base station, and transmitting a registration identification to said first base station, storing a service area identity corresponding to said first base station in said given station, sensing when the given mobile station is no longer within range of said first base station, then attempting to receive signals from a second base station, responsive to receipt of signals from said second base station, transmitting a registration identification to said second base station if a service area identity corresponding to said second base station is not already stored in said given station, and if a registration identification is transmitted to said second base station, determining if the number of service area identities currently stored in the location record equals n, where n > 1; and if the number equals n, replacing a service area identity already stored in said mobile location record with a second service area identity corresponding to said second base station; and if the number is less than n, storing in said given station said second service area identity, storing in a control arrangement a station location record containing the most recent service area identities of the base stations to which said given mobile station has transmitted a registration identification, up to a maximum of n identities, directing any message to be transmitted to said given mobile station to be transmitted from on of the base stations whose service area identity is stored in the station location record, and if transmission from said one base station is not answered, then transmitting the message from another base station whose service area identity is stored in the station location record.

* * * * *